United States Patent Office 3,484,808
Patented Dec. 16, 1969

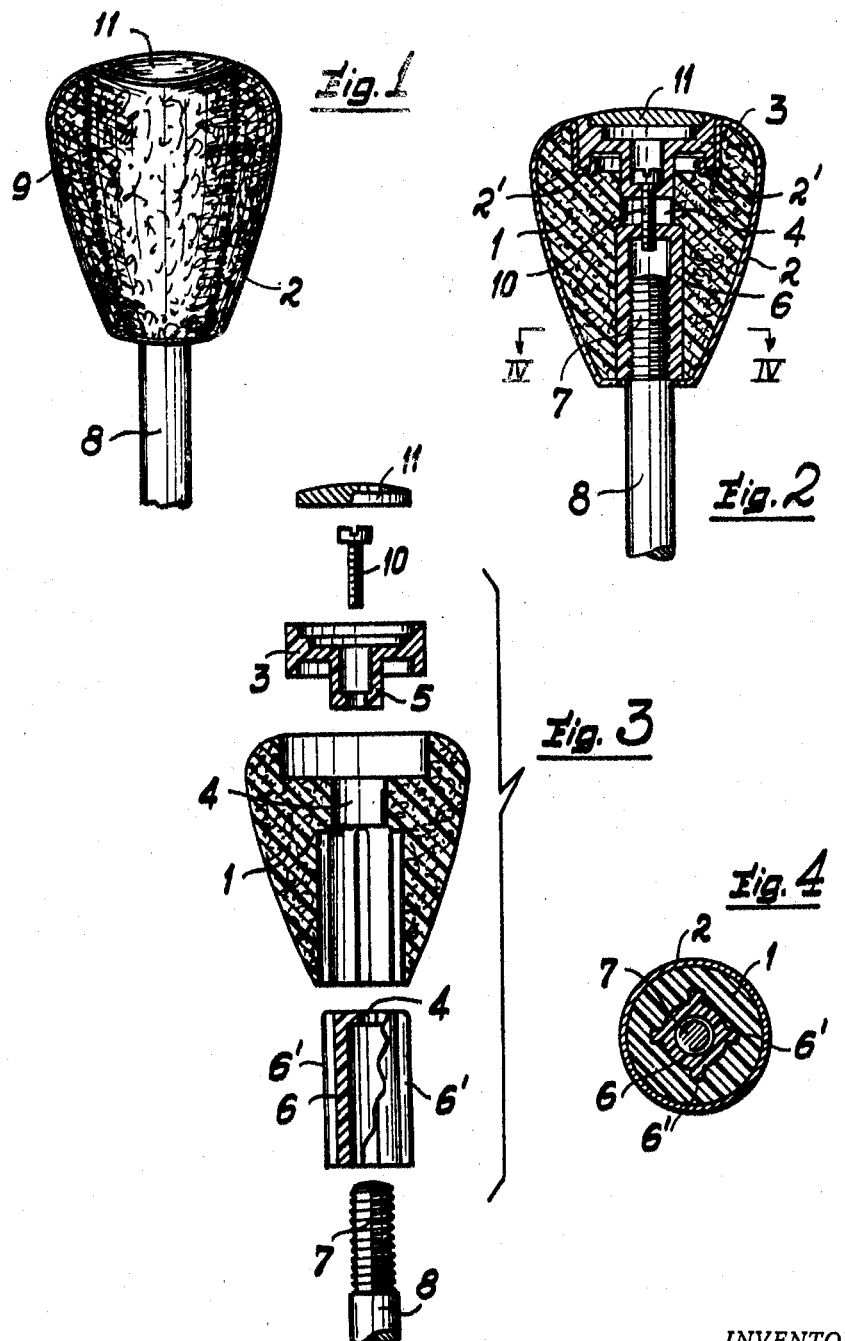

3,484,808
KNOB FOR SPEED TRANSMISSION LEVER OF MOTOR VEHICLES
Giovanni Conterno, Via Cavour 9,
Vedano Olona, Varese, Italy
Filed Dec. 11, 1967, Ser. No. 689,688
Claims priority, application Italy, Dec. 9, 1966,
Patent 784,751
Int. Cl. G05g 1/10
U.S. Cl. 74—543                                6 Claims

ABSTRACT OF THE DISCLOSURE

Knob for speed transmission lever of motor vehicles, formed of a soft body, preferably covered with leather or other material, and comprising in its inside a bushing consisting of more rigid material for its fastening to the end of the speed transmission lever.

---

This invention relates to a knob for speed transmission lever of motor vehicles, motor boats and vehicles in general, characterized in that the aforesaid knob shows a soft body, possibly provided with suitable covering which is preferably sewn.

Apart from the evident comfort and eased grip, such knob proves to be above all useful in case of competitions, races, etc. where the frequency and the rapidity with which the transmission lever should be actuated might cause the formation of blisters in the driver's hands, provided by the rigid edges of the usual knobs, consisting of wood or hard plastic material.

The knob according to the present invention shows instead a body constituted of soft and elastic material (rubber, expanded plastics or the like), containing on the lower part a bushing for fitting to the transmission rod, and possibly provided with a .eather covering (or imitation leather, or other suitable material). Such covering is preferably formed, according to the present invention, of gussets sewn to one another and completed on the upper part with a cap (consisting of metal, plastics or wood), embedded or glued. The knob covering may be, of course, glued by suitable adhesive means on the soft body in order to improve the jointing stability and to ensure a safe grip of the knob itself. These and other features as to operation and construction of the knob improved according to this invention will be better understood with the aid of the figures shown in the accompanying drawing, in which:

FIG. 1 represents the knob according to this invention in side view;

FIG. 2 shows the same knob in vertical section;

FIG. 3 illustrates the main components of the knob, taken apart; and

FIG. 4 is a section of the closs plane IV—IV in FIG. 2.

Referring now to the aforementioned figures, there will be seen therefrom that the knob according to this invention shows the body 1 which may be provided with an outer covering 2, turned over on the upper part in 2′ (FIG. 2) and formed by the cap 3, fixedly secured by gluing and/or by means of a locking screw 10 on the knob or a bushing 6, respectively. Said cap is preferably fitted with a portion 5 which inserts into the vertical through-hole 4 existing inside the body 1.

Said bushing 6, made from self-threading p'astics, is inserted on the lower part of said body, and is adapted to receive by screwing and consequent self-threading the threaded end or provided with reliefs 7 of the transmission lever 8. Should the locking screw 10 be used, the cap 3 shows a space which may be covered with a plate 11, which is suitably machined with esthetic effects.

The aforementioned bushing 6 is made integral with the body 1 by means of one or more longitudinal reliefs 6′, which accommodate in corresponding recesses of said body. If the eventual covering is formed of different portions (consisting of leather or o:her suitable material), then these are joined one another by means of sewings 9, suitab y arranged in order to adapt in the best manner possible the outer casing to the configuration of the knob body, so as to reach a perfect adhesion.

From the foregoing figures and the previous disclosure it is possible to note the great simplicity in manufacture of the knob according to the present invention and the notable operating and practical advantages afforded by the knob improved according to this invention.

Anyhow, the improved knob has been described and represented only by way of non-limiting example and to show its practical embodiment and the features of the present invention.

From the foregoing it will be seen that the knob for the transmission lever of vehicles in general may be subject to several changes and modifications depending upon the different conveniences of manufacture and the individual specific applications provided for the knob, and also any such changes and modifications as would be suggested by practical experiencce. The aforementioned changed embodiments could re'ate, for example, to the actual configuration and mutual proportion of the aforesaid operating parts as well as material used from time to time for their execution, all without departing from the scope of the present invention.

I claim:

1. In a structure of the character indicated, particularly in a variable speed transmission, a combination comprising an elongated carrier movable between a plurality of positions, said carrier having an end; a knob applied to the end of said carrier and displaceable by hand to move the carrier between said positions thereof, said knob having an external surface and the material of said knob adjacent to at least a substantial portion of said surface being deformable; a deformable covering applied about the external surface of said knob; and fastening means securing said knob to the end of said carrier and including means for securing a portion of said covering to said knob.

2. A combintion as defined in claim 1, wherein said material is elastic.

3. A combination as defined in claim 1, wherein said knob tapers in a direction toward the end of said carrier.

4. In a structure of the character indicated, particularly in a variable speed transmission, a combination comprising an elongated carrier movable between a plurality of positions, said carrier having an end; a knob applied to the end of said carrier and displaceable by hand to move the carrier between said positions thereof, said knob having an external surface and the material of said knob adjacent to at least a substantial portion of said surface being deformable, said knob having an open-ended passage, including an enlarged portion remote from the end of said carrier; and fastening means extending through said passage and securing the knob to said carrier, said fastening means comprising a first member secured to the end of said carrier and a second member which is received in said enlarged portion and separably connected with said first member.

5. A combination as defined in claim 4, wherein the fastening means comprises a tubular member which is non-rotatably received in said passage, said tubular member being threadedly connected with the end of said carrier.

6. A combination as defined in claim 4, further comprising a closure which is removably received in said enlarged portion and covering the second member of said fastening means.

References Cited

UNITED STATES PATENTS

| | | | |
|---|---|---|---|
| 619,223 | 2/1899 | Ramey et al. | 16—121 |
| 1,690,052 | 10/1928 | Carlson | 16—118 |
| 2,007,555 | 7/1935 | Wiltshire | 16—121 |
| 2,199,018 | 4/1940 | Bahr | 16—121 |
| 3,396,604 | 8/1968 | Samuels et al. | 16—121 XR |

FRED C. MATTERN, Jr., Primary Examiner

F. D. SHOEMAKER, Assistant Examiner

U.S. Cl. X.R.

16—121